United States Patent [19]

Regnault

[11] Patent Number: 5,247,486
[45] Date of Patent: Sep. 21, 1993

[54] METHOD FOR DETERMINING THE FAR-FIELD SIGNATURE OF A PLURALITY OF SEISMIC SOURCES

[75] Inventor: Alain Regnault, Antony, France

[73] Assignee: Compagnie Generale de Geophysique, Massy Cedex, France

[21] Appl. No.: 13,569

[22] Filed: Feb. 4, 1993

[30] Foreign Application Priority Data

Feb. 6, 1992 [FR] France ................................ 92 01343

[51] Int. Cl.$^5$ .............................................. G01V 1/38
[52] U.S. Cl. ...................................... 367/23; 181/118
[58] Field of Search .................... 367/21, 23; 181/110, 181/118

[56] References Cited

U.S. PATENT DOCUMENTS

| | | | |
|---|---|---|---|
| 4,648,080 | 3/1987 | Hargreaves | 367/20 |
| 4,658,384 | 4/1987 | Dragoset, Jr. et al. | 367/23 |
| 4,827,456 | 5/1989 | Brac | 367/23 |
| 4,868,794 | 9/1989 | Zilkowski et al. | 367/23 |
| 4,908,801 | 3/1990 | Bell et al. | 367/23 |

*Primary Examiner*—Ian J. Lobo

[57] ABSTRACT

A method for determining a far-field signature FF(t) of a plurality of N seismic sources Si (i=1, ..., N) comprises a stage of measuring a near-field signature NFi(t) of each seismic source Si. In a preliminary stage an initial near-field signature NFio(t) of each seismic source Si and an initial far-field signature FFo(t) of the plurality of N seismic sources are measured simultaneously. An operator G is determined, defined by the convolution integral $$\sum_{i=1}^{N} NFio(t) * G = FFo(t)$$

The near-field signature NFi(t) measuring stage is carried out on each firing of the N seismic sources Si. The far-field signature FF(t) is determined from the equation $$FF(t) = \sum_{i=1}^{N} NFi(t) * G$$

1 Claim, 1 Drawing Sheet

METHOD FOR DETERMINING THE FAR-FIELD SIGNATURE OF A PLURALITY OF SEISMIC SOURCES

BACKGROUND OF THE INVENTION

1. Field of the invention

The present invention concerns a method for determining the far-field signature of a plurality of seismic sources.

The invention finds a particularly advantageous application in the field of marine seismic exploration.

2. Description of the Prior Art

Geophysical exploration of the ocean floor is usually carried out by ships towing acoustic sources which emit acoustic waves in different directions towards the ocean floor to be surveyed. The reflected acoustic waves are detected by transducers disposed along cables called streamers also towed by the survey ship. Analysis of the reflected waves relative to the waves emitted by the sources provides data on the structure, nature and composition of the ocean floor.

The acoustic sources used in marine seismics are usually sets of immersed sources or air guns forming a regular one-dimensional or three-dimensional array. To emit an acoustic wave in a given direction emission by the sources is controlled according to a phase law which governs the phase difference between the sources. Specifically, to emit a wave vertically, i.e. perpendicular to the water surface, the nominal phase law is uniform in the sense that the sources all emit at the same time.

To check that the incident acoustic wave is emitted without anomalies and to apply any corrections that may be needed to the signals picked up by the streamer hydrophones a reference signal must be provided each time the air guns are fired and representing the acoustic wave as received at a great distance from its source by the geological structures to be surveyed. This reference signal is the far-field signature $FF(t)$.

In practise, wherever possible the far-field signature of the seismic source system is measured directly by immersing a hydrophone at a depth up to 1 000 m vertically below the array of seismic sources.

In the geophysical exploration of continental plates at a shallow depth of 200 to 300 m, for example, it is not possible to acquire the far-field signature by simple direct measurement. Indirect methods are then used, such as that described in European patent application No 0 400 769. These generally entail deriving a far-field signature $FF(t)$ from the measured near-field signature $NFi(t)$ of each seismic source $Si$. A hydrophone is associated with each air gun for this purpose and the signal detected by the hydrophone constitutes the near-field signature of the respective source.

Prior art methods which derive the far-field signature $FF(t)$ from the near-field signature $NFi(t)$ apply correction algorithms to each near-field signature and then sum the corrected near-field signatures.

This type of method has the drawback of using theoretical algorithms based on hypotheses which are often somewhat approximate and cast doubt on the accuracy of the result. Also, the processing of the raw data, that is the near-field signatures, requires relatively long computation time on powerful computers.

The technical problem to be solved by the present invention is therefore that of providing a method of determining a far-field signature $FF(t)$ of a plurality of N seismic sources $Si$ ($i=1, \ldots, N$) by measuring a near-field signature $NFi(t)$ of each source $Si$ that is much simpler to implement than known methods and which gives more reliable results.

SUMMARY OF THE INVENTION

The present invention consists in a method for determining a far-field signature $FF(t)$ of a plurality of N seismic sources $Si$ ($i=1, \ldots, N$) comprising a stage of measuring a near-field signature $NFi(t)$ of each seismic source $Si$ characterized in that said method comprises the following operations:

in a preliminary stage measuring simultaneously an initial near-field signature $NFio(t)$ of each seismic source $Si$ and an initial far-field signature $FFo(t)$ of said plurality of N seismic sources, determining an operator G defined by the convolution integral $$\sum_{i=1}^{N} NFio(t) * G = FFo(t)$$

on each firing of the N seismic sources $Si$, carrying out said near-field signature $NFi(t)$ measuring stage, and determining said far-field signature $FF(t)$ from the equation $$FF(t) = \sum_{i=1}^{N} NFi(t) * G$$

The method of the invention is therefore based on the proven hypothesis of a linear relationship between the far-field signature and the near-field signatures. Specifically, it is not necessary to use theoretical models whose validity is not always proven. Also, the operator G having been determined once and for all at the end of the preliminary stage, the required far-field signature can be calculated as a function of the near-field signatures in a much shorter time than with the known procedures.

The following description given with reference to the appended drawing and by way of non-limiting example only clearly shows in what the invention consists and how it may be put into effect.

DETAILED DESCRIPTION OF THE INVENTION

Figure 1:
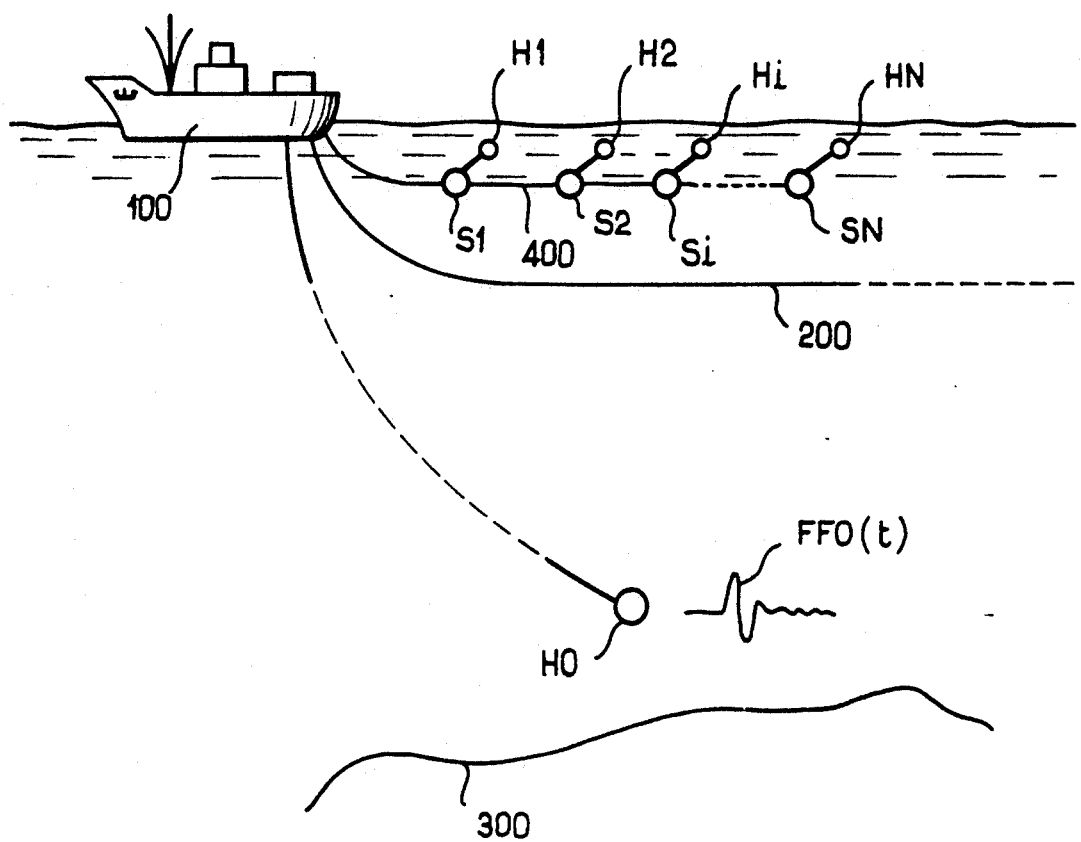
FIG. 1 is a diagrammatic view in cross-section of a marine seismic exploration system using a method in accordance with the invention.

The exploration system shown in FIG. 1 comprises a ship 100 towing at least one streamer 200 of great length (3 kilometers, for example) along which are disposed acoustic sensors (not shown). An incident acoustic wave emitted by an array 400 of a plurality of N seismic sources $Si$ where $i=1, \ldots, N$ is reflected from the ocean floor 30 to be surveyed and the reflected wave is picked up by these sensors.

To determine a far-field signature $FF(t)$ of these sources a hydrophone Hi is associated with each of said sources in order to measure a near-field signature of the source on each firing.

In a preliminary stage carried out during a survey in which direct measurement of the far-field is possible, an initial near-field signature NFio(t) is recorded for each source and a hydrophone Ho immersed at a great depth provides an initial far-field signature FFo(t).

An operator G relating the sum $$\sum_{i=1}^{N} NFio(t)$$

of the initial near-field signatures to the signature FFo(t) by the following convolution integral is then determined:

$$\sum_{i=1}^{N} NFio(t) * G = FFo(t)$$

The operator G may be determined as follows.
The sum $$NFo(t) = \sum_{i=1}^{N} NFio(t)$$

is sampled on m+1 values:
NFo(t) = (nf$_o$, nf$_l$, . . . , nf$_m$).

Similarly, the initial far-field signature FFo(t) is sampled on n+1 values:

FFo(t) = (ff$_o$, ff$_l$, . . . , ff$_n$).

The required operator G is itself defined by p+1 values:

G = (g$_o$, g$_l$, . . . , g$_p$).

The method of calculating the coefficients of G entails matching the product NFo(t) to FFo(t) optimally in the least squares sense.

The problem therefore reduces to finding an operator G which minimizes the expression:

$$\sum_{j=0}^{N} [(nf*g)_j - ff_j]^2$$

Expanding and differentiating relative to the unknowns g$_k$, the following p equations are obtained:

$$\begin{cases} A_0 g_0 + A_1 g_1 + \ldots + A_p g_p = C_0 \\ \overline{A_1 g_0 k + A_0 g_1 + \ldots + A_{p-1} g_p = C_1} \\ A_p g_0 + A_{p-1} g_1 + \ldots + A_0 g_p = C_p \end{cases} (\Gamma)$$

where $$A_k = \sum_{q=0}^{m} nf_q nf_{q+k}$$

$$C_k = \sum_{q=o}^{m} nf_q ff_{q+k}$$

and (Γ) is a Toeplitz system resolved by the binomial Wiener-Lewison algorithm.

To reduce amplification of noise a weighting coefficient $\epsilon^2$ may be introduced. In this case the expression to be minimized is:

$$\sum_{j=0}^{n} [(nf*g)_j - ff_j]^2 + \epsilon^2 \sum_{j=0}^{n} g_j^2$$

The system of equations obtained in this way is similar to ( ) except that the coefficient A$_0$ is replaced by A$_0$+$\epsilon^2$.

The operator G having been determined in this way for a given configuration of sources, the method in accordance with the invention then entails, during the actual survey, measuring the near-field signature NFi(t) of each source for each firing of N seismic sources Si and determining the far-field signature FF(t) from the equation:

$$FF(t) = \sum_{i=1}^{N} NFi(t) * G$$

This provides a means of monitoring the system of sources. In the event of an anomaly such as a source malfunction or deformation of the array geometry, the far-field signature will differ from that previously defined which will invalidate the corresponding firing.

The far-field signature is also used to convert the signals detected by the sensors in the streamers to minimum phase signals.

There is claimed:
1. Method for determining a far-field signature FF(t) of a plurality of N seismic sources Si (i=1, N) comprising a stage of measuring a near-field signature NFi(t) of each seismic source Si characterized in that said method comprises the following operations:
in a preliminary stage measuring simultaneously an initial near-field signature NFio(t) of each seismic source Si and an initial far-field signature FFo(t) of said plurality of N seismic sources,
determining an operator G defined by the convolution integral $$\sum_{i=1}^{N} NFio(t) * G = FFo(t)$$

on each firing of the N seismic sources Si, carrying out said near-field signature NFi(t) measuring stage, and
determining said far-field signature FF(t) from the equation $$FF(t) = \sum_{i=1}^{N} NFi(t) * G.$$

* * * * *